June 27, 1967           S. HARAC ETAL           3,328,691
METHOD AND APPARATUS EMPLOYING A SYNCHRONOUSLY DRIVEN MASTER
GENERATOR FOR MEASUREMENT OF COMPOSITE
ERROR IN RESOLVERS
Filed March 18, 1963
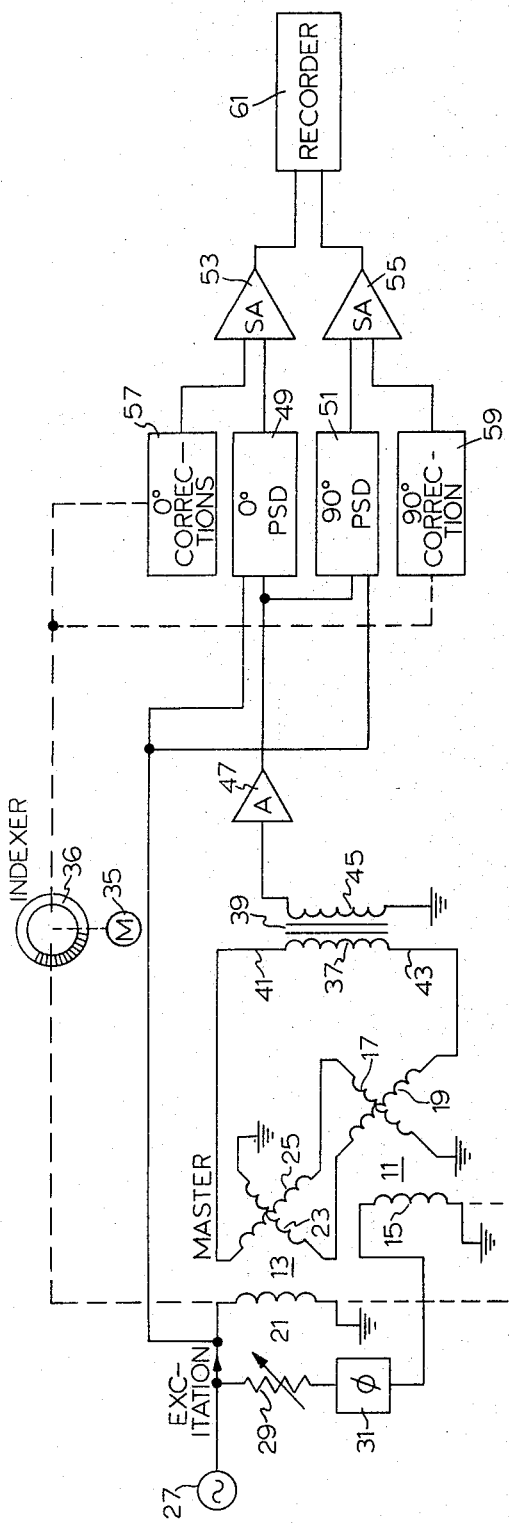
SIGMUND HARAC
DONALD V. Di MASSIMO
INVENTORS
BY *S. A. Giarratana*
*Francis L. Masselle*
ATTORNEYS

United States Patent Office 3,328,691
Patented June 27, 1967

3,328,691
METHOD AND APPARATUS EMPLOYING A SYNCHRONOUSLY DRIVEN MASTER GENERATOR FOR MEASUREMENT OF COMPOSITE ERROR IN RESOLVERS
Sigmund Harac, Verona, and Donald V. Di Massimo, New Brunswick, N.J., assignors to General Precision, Inc., Little Falls, N.J., a corporation of Delaware
Filed Mar. 18, 1963, Ser. No. 265,695
14 Claims. (Cl. 324—158)

This invention relates to the measurement of resolver composite error and more particularly to an apparatus for dynamically measuring resolver composite error.

Resolver composite error is the error in the output signals of a resolver that results from the combined effect of functional error, unbalance, and lack of perpendicularity. A conventional resolver has two output windings from which AC signals are generated having amplitudes proportional to the sine and cosine of the angular position of the input shaft of the resolver. Functional error is the error in the output signal from one winding as compared to a perfect sine wave. Unbalance is a difference in maximum amplitude or a difference in phase or both between the two output signals. A difference in maximum amplitude is caused by one output winding having a different transformation ratio than the other. A difference in phase occurs because the signal generated by one output winding is shifted in phase from the excitation voltage applied to the input winding of the resolver a different amount than the signal generated by the other output winding. Perpendicularity is the precision with which the output windings of the resolver are aligned. When the rotor of the resolver is positioned so that the signal from one output winding is at its null, the signal from the other output winding should be a maximum, and when the rotor resolver is rotated 90° from this position, the signal from the former output winding should be at its maximum while the signal from the latter output winding should be at its null. To the extent that the resolver output signals fail to be so related, the resolver lacks perpendicularity. Thus composite error takes into account not only errors in the output signals of the resolvers considered individually but also errors in the relationship between the output signals.

Prior to the present invention composite error was measured in resolvers by detecting the error at the discrete angular positions. In addition to taking a long period of time this static testing procedure has the disadvantage that the composite error in the output from a tested resolver that occurs between the discrete angular positions where the composite error is detected is not determined. Hence it is possible that an excess composite error in the output of the resolver may be overlooked. Furthermore, the static testing does not determine the composite error that occurs under actual working conditions. Under actual working conditions the resolver will be rotating when its output is being made use of and the output signals from the resolver when it is rotating do not precisely correspond with the output signals of the resolver when it is not rotating because of speed voltage effects, which are components of the output signals of the resolver which are generated by the resolver as functions of the ratio of the resolver speed to excitation frequency. Because of these speed voltage effects, static testing does not provide an accurate measurement of composite error in the output of resolvers under actual working conditions.

Accordingly, an object of the present invention is to provide an improved method and system for testing resolvers.

Another object of this invention is to provide an improved method and system for detecting composite error in resolvers.

A further object of this invention is to provide an improved system for detecting composite error in resolvers dynamically.

A still further object of the present invention is to provide a method and system for detecting composite errors of resolvers with infinite resolution.

A still further object of the present invention is to provide a method and system for detecting composite error in resolvers under conditions approximating actual working conditions.

A still further object of the present invention is to reduce the time required to test resolvers for composite error.

The above objects of the invention are achieved in accordance with the present invention by connecting the output windings of the resolver in series with the sine and cosine outputs from a master. The sine output winding from the resolver being tested is connected in series with a cosine output from the master and the cosine output from the resolver being tested is connected to the sine output from the master. The rotors of the master and the resolver being tested are driven in synchronism and the voltages resulting from the series connections are compared by applying them to the opposite sides of the primary winding of a transformer. Any voltage resulting in the secondary winding of this transformer will be caused by composite error in the resolver being tested if the output from the master is perfect. The in-phase and quadrature components of error signal are determined by respective phase sensitive detectors and corrections are added to the output from these detectors to compensate for repeating errors in the output from the master and the resulting signals obtained after this compensation will accurately represent the composite error in the resolver being tested.

Many other objects and advantages of the present invention will become readily apparent as the following detailed description of the invention unfolds and when taken in conjunction with the single figure of the drawings, which is a circuit diagram of the system of the present invention.

In the drawings the reference number 11 designates the resolver under test and the reference number 13 designates the master. The resolver 11 has an input winding 15 and output windings 17 and 19. The winding 17 produces a signal proportional to the sine of the angular position of the input shaft of the resolver 11 whereas the winding 19 produces an output signal proportional to the cosine of the angular position of the input shaft of the resolver 11. the master 13 in the preferred embodiment, as illustrated in the drawings, is a highly accurate resolver and comprises an input winding 21 and output windings 23 and 25. The output winding 23 produces an output signal proportional to the sine of the angular position of the input shaft of the master 13, whereas the output winding 25 produces an output signal proportional to the cosine of this angular position. The input winding 21 of the master 13 is excited directly from an AC source 27 and the winding 15 is excited from the source 27 through a variable resistor 29 and a variable phase shift network 31. The rotors of resolvers 11 and 13 are coupled together and to a spindle 36 which is driven by a motor 35 so that the rotors of the resolver 11 and the master 13 will be rotated together in synchronism by the motor 35. The angular position of the rotor of the resolver 11 is adjusted so as to always be at the same angular position as the rotor of the master 13. One side of the sine output winding 17 of the resolver 11 is connected to ground and the other side of the winding 17 is connected to one side of the cosine output winding 25 of the master 13. The other side of the output winding 25 is connected to one side 41 of the primary winding 37 of a transformer 39. One side of the sine output winding 23 of the master 13 is connected to ground and the other side of the winding 23 is connected to one side of the cosine output winding 19 of the resolver 11. The other side of the winding 19 is connected to the opposite side 43 of the primary winding 37 from that to which the winding 25 is connected. Thus, the sine output winding 17 of the resolver 11 and the cosine output winding 25 of the master 13 are connected in series between the side 41 of the primary winding 37 and ground and the cosine output winding 19 of the resolver 11 and the sine output winding 23 of the master 13 are connected in series between the other side 43 of the primary winding 37 and ground. The signal voltages applied to the two sides of the primary windings 41 and 43 can be expressed as follows:

$$V1 = B \sin\theta + A \angle\varphi [\cos\theta + f_1(\theta)] \quad (1)$$
$$V2 = B \cos\theta + A' \angle\varphi' [\sin\theta + f_2(\theta)] \quad (2)$$

In the above expressions V1 represents the signal voltage applied between the side 43 of the primary winding 37 and ground and V2 represents the signal voltage applied between the side 41 of the primary winding 37 and ground; B is the maximum output signal from both output windings 23 and 25 of the master 13; A is the maximum output signal from the cosine output winding 19 of the resolver 11; A' is the maximum output signal from the sine output winding 17 of the resolver 11; $\varphi$ is the phase shift in the signal voltage produced in the output winding 19 with respect to the excitation voltage; $\varphi'$ is the phase shift in the signal voltage produced in the sine output winding 17; $\theta$ represents the angular position of the rotors of both the master 13 and the resolver 11; $f_1(\theta)$ is the functional error for the output winding 19 of the resolver 11 and $f_2(\theta)$ is the functional error for the output winding 17 of the resolver 11. If the resolver 11 has no functional error, perpendicularity error or unbalance, that is no composite error, then the following expressions are true:

$$V1 = B \sin\theta + A \angle\varphi \cos\theta = B \sin\theta + A \cos\theta \cos\varphi$$
$$+ jA \cos\theta \sin\varphi \quad (3)$$
$$V2 = B \cos\theta + A \angle\varphi \sin\theta = B \cos\theta + A \sin\theta \cos\varphi$$
$$+ jA \sin\theta \sin\varphi \quad (4)$$

If no signal voltage is produced in the output winding of the transformer 39, V1 will equal V2 and the real portions of the expressions (3) and (4) will be equal. Accordingly, the following equation will be true if there is no composite error and V1 and V2 are equal:

$$B \sin\theta + A \cos\theta \cos\varphi = B \cos\theta + A \sin\theta \cos\varphi \quad (5)$$

From the expression (5) the following equations are derived:

$$A \cos\varphi (\cos\theta - \sin\theta) = B (\cos\theta - \sin\theta) \quad (6)$$
$$\cos\varphi = B/A \quad (7)$$

If $V1 = V2$ then the imaginary portions of expressions (3) and (4) must also be equal. Accordingly, the following equation must be true in the errorless case if no signal voltage is produced in the secondary winding 45:

$$A \cos\theta \sin\varphi = A \sin\theta \sin\varphi \quad (8)$$

For Equations 7 and 8 to be true for all values of $\theta$, $\varphi$ must be 0 and B must equal A. Thus if there is no composite error and there is no phase difference or difference in amplitude between the output signals of the resolver 11 and the output signals of the master 13, no signal will be generated in the secondary 45 of the transformer 39. By means of the variable resistor 29 and the phase shift network 31 the output signals of the resolver 11 are adjusted so that, on the average, the amplitudes of the output signals of the resolver 11 equal the amplitudes of the output signals of the master 13. The phase of the output signals of the resolver 11 is the same as that of the output signals of the master 13. With the phase shift network 31 and the variable resistor 29 so adjusted, any output signal produced in the secondary winding 45 of the transformer 39 will be caused by and will represent composite error, provided that the output signals from the master 13 are perfect. Because the signal applied to the side 41 of the primary winding 37 of the transformer 39 is always nearly equal to the signal applied to the side 43, the effective impedance to the signals applied to each side of the primary winding 37 is very high. As a result decoupling amplifiers are not needed between the primary winding 37 and the outputs of the master 13 and the resolver 11. Such decoupling amplifiers if needed would constitute a major limitation in making dynamic composition error measurements on high precision units.

The signal induced in the secondary winding 45 is amplified by an amplifier 47 and then fed to phase sensitive detectors 49 and 51. The phase sensitive detector 49 detects the amplitude of the signal applied by the amplifier 47 in phase with the excitation voltage generated by the source 27 and produces a DC output signal proportional to this in phase component. The phase sensitive detector 51 detects the amplitude of that component in the output signal of the amplifier 47 90° out of phase with the excitation voltage produced by the source 27 and produces a DC output signal proportional to this quadrature component. The output signal from the phase sensitive detector 49 is fed to a differential amplifier 53 and the output signal from the phase sensitive detector 51 is fed to a differential amplifier 55. The differential amplifier 53 also receives a signal from a correction network 57 and produces an output signal proportional to the difference between the two applied signals. The correction network 57 has an input shaft coupled to the spindle 36 so as to be driven by the motor 35 in synchronism with the rotors of resolvers 11 and 13 and the correction network 57 applies a signal voltage to the amplifier 53 which is a function of the angular position of the input shaft of the resolver 13. This signal applied to the amplifier 53 by the correction network 57 corrects the output signal of the amplifier 53 for the in phase component in the output signal from the amplifier 47 caused by composite error in the output from the master 13 so that the output signal of the amplifier 53 precisely represents the in phase component of composite error in the output of the resolver 11. A correction network 59 is also coupled to the spindle 36 to be driven by the motor 35 in synchronism with the rotors of the resolvers 11 and 13. The correction network 59 like the correction network 57 produces an output signal voltage which is a function of the angular position of the input shaft of the master 13 and this signal is applied to an input of the amplifier 55. The amplifier 55 produces an output signal voltage proportional to the difference between the signal voltages applied from the phase sensitive detector 51 and the correction network 59. The signal applied to the amplifier 55 by the correction network 59 corrects the output signal of the amplifier 55 for the quadrature component in the output signal of the amplifier 47 caused by composite error in the output of the master 13, so that the output from the amplifier 55 precisely represents the quadrature component of the composite error in the output from the resolver 11. The output signal voltages of the amplifiers 53 and 55 are recorder by recorder 61. Thus, when the motor 35 rotates the rotors of resolvers 11 and 13 with the resistor 29 properly adjusted and the phase sensitive network 31 properly adjusted, the recorder 61 will record the composite error in the output from the resolver 11 as represented by the output signals of the amplifiers 53 and 55. The composite error is recorded as the rotor of the resolver 11 is being continuously rotated so that speed voltage effects are taken into account and the composite error is detected with infinite resolution or in other words the composite error is detected dynamically. If it is desired to statically measure the composite error, the spindle 36 can be used to position the rotors of the resolver 11 and the master 13 at discrete angular positions and the composite error can be detected at each discrete angular position. The spindle 36 is provided with indexing means so as to position the rotors of the resolvers 11 and 13 precisely at each of the discrete angular positions at which static measurements are to be taken. The above described system permits the measurement of composite error in resolvers which are accurate to one arc-minute. The time for taking the measurements is reduced from the hour required by systems of the prior art to five minutes.

The signal produced in the secondary winding 45 of the transformer 39 could be synthesized by subtracting the signal generated in the winding 19 from the signal generated in the winding 17 and subtracting the signal generated in the winding 23 from the signal generated in the winding 25 and then adding the two resulting differences together. Instead of using an accurate resolver for the master 13, a deposited carbon film sine-cosine potentiometer could be used. Such a master would have the advantage of having no quadrature component of error and no speed voltage effects. The lack of any quadrature component of error in the output from the master would mean that the correction network 59 would not be needed and could be omitted. Such a master however would not have the accuracy of a precision wound resolver. A solid state resolver, which makes use of the Hall effect to generate its output signals, could also be used as the master. These and many other modifications may be made to the preferred embodiment of the invention described above without departing from the spirit and scope of the invention, which is defined in the appended claims.

What is claimed is:

1. A system for detecting composite error in a resolver designed to produce a first output signal proportional to the sine of an input angle and a second output signal proportional to the cosine of said input angle comprising: first means to generate an output signal equal to the sum of said first output signal plus a signal proportional to the cosine of said input angle, second means to generate an output signal equal to the sum of said second signal plus a signal proportional to the sine of said input angle, differential transformer means responsive to the output signals of said first and second means to generate a signal proportional to the difference between the values represented by the output signals of said first and second means and phase sensitive detector means connected to said transformer output for providing a first direct potential output signal proportional to the in-phase component and a second direct potential output signal proportional to the quadrature component with relation to said input angle.

2. A system for detecting composite error in a resolver designed to produce a first output signal proportional to the sine of an input angle and a second output signal proportional to the cosine of said input angle comprising: a master operable to generate a first output signal proportional to the sine of said input angle and a second output signal proportional to the cosine of said input angle, first circuit means to generate an output signal proportional to the sum of the first output signal of said resolver plus the second output signal of said master, second circuit means to generate a signal proportional to the sum of said second output signal of said resolver plus the first output signal of said master, and means responsive to the output signals of said first and second circuit means to produce a signal proportional to the difference between the output signals of said first and second circuit means.

3. A system for detecting composite error in a resolver designed to produce a first output signal proportional to the sine of an input angle and a second output signal proportional to the cosine of said input angle comprising: a master operable to generate a first output signal proportional to the sine of said input angle and a second output signal proportional to the cosine of said input angle, and means to generate a signal proportional to the first output signal of said resolver plus the second output signal of said master minus the second output signal of said resolver minus the first output signal of said master.

4. A system for detecting composite error in a resolver designed to produce a first output signal proportional to the sine of an input angle and a second output signal proportional to the cosine of said input angle comprising: a master operable to generate a first output signal proportional to the sine of said input angle and a second output signal proportional to the cosine of said input angle, means responsive to the output signals from said resolver and said master to generate a signal proportional to the first output signal of said resolver plus the second output signal of said master minus the second output signal of said resolver minus the first output signal of said master, and means to selectively vary the amplitudes of the output signals of one of said master and said resolver.

5. A system for detecting composite error in a resolver designed to produce a first AC output signal having an amplitude proportional to the sine of an input angle and a second AC output signal proportional to the cosine of said input angle comprising: a master operable to generate a first AC output signal having an amplitude proportional to the sine of said input angle and a second AC output signal having an amplitude proportional to the cosine of said input angle, means responsive to the output signals of said resolver and said master to generate a signal proportional to the first output signal of said resolver plus the second output signal of said master minus the second output signal of said resolver minus the first output signal of said master, means to selectively vary the amplitudes of the output signals of one of said master and said resolver, and means to selectively vary the phases of the outputs of one of said master and said resolver.

6. A system for detecting composite error in a resolver designed to produce a first AC output signal having an amplitude proportional to the sine of an input angle and a second AC output signal having an amplitude proportional to the cosine of said input angle comprising: a master operable to produce a first AC output signal having an amplitude proportional to the sine of said input angle and a second AC output signal having an amplitude proportional to the cosine of said input angle, a transformer having a primary winding and a secondary winding, means to apply to one side of said primary winding a signal proportional to the first output signal of said resolver plus the second output signal of said master, and means to apply to the other side of said primary winding a signal proportional to the second output signal of said resolver plus the first output signal of said master.

7. A system for dynamically detecting composite error in a resolver designed to produce a first output signal proportional to the sine of an input angle and a second output signal proportional to the cosine of said input angle comprising: first means to generate an output signal equal to the sum of said first output signal plus a signal proportional to the cosine of said input angle, second means to generate a signal equal to the sum of said second signal plus a signal proportional to the sine of said input angle, differential transformer means responsive to the output signals of said first and second means to generate a signal proportional to the difference between the values represented by the output signals of said first and second means, means to continuously change said input angle while said third means is generating its output signal and phase sensitive detector means connected to said transformer output for providing a first direct potential output signal proportional to the in-phase component and a second direct potential output signal proportional to the quadrature component with relation to said input angle.

8. A system for dynamically detecting composite error in a resolver designed to produce a first output signal proportional to the sine of an input angle and a second output signal proportional to the cosine of said input angle comprising: a master operable to generate a first output signal proportional to the sine of said input angle and to generate a second output signal proportional to the cosine of said input angle, circuit means to generate a signal proportional to the first output signal of said resolver plus the second output signal of said master minus the second output signal of said resolver minus the first output signal of said master, and means to continuously change said input angle while said circuit means is producing its output signal.

9. A system for dynamically detecting composite error in a resolver designed to produce a first AC output signal proportional to the sine of an input angle and a second AC output signal proportional to the cosine of said input angle comprising: a master operable to produce a first AC output signal proportional to the sine of said input angle and a second AC output signal proportional to the cosine of said input angle, a transformer having a primary winding and a secondary winding, means to apply to one side of said primary winding a signal proportional to the first output signal of said resolver plus the second output signal of said master, means to apply to the other side of said primary winding a signal proportional to the second output signal of said resolver plus the first output signal of said master, means to selectively vary the amplitudes of the output signals of one of said master and said resolver, means to selectively vary the phases of the output signals of one of said master and said resolver, and means to continuously change said input angle while said output signals of said first and second circuit means are being applied to opposite sides of the primary winding of said transformer.

10. A system for dynamically detecting composite error in a resolver designed to produce a first output signal proportional to the sine of an input angle and a second output signal proportional to the cosine of said input angle comprising: a master operable to produce a first output signal proportional to the sine of said input angle and a second output signal proportional to the cosine of said input angle, first circuit means operable to produce an output signal proportional to the first output signal of said resolver plus the second output signal of said master, second circuit means to produce an output signal proportional to the second output signal of said resolver plus the first output signal of said master, third circuit means responsive to the output signals of said first and second circuit means to produce an output signal proportional to the difference between the output signals of said first and second circuit means, and means to continuously change said input angle while said third circuit means is producing its output signal.

11. A method of detecting composite error in a resolver designed to produce a first output signal proportional to the sine of an input angle and a second output signal proportional to the cosine of said input angle comprising the steps of: generating a third signal proportional to the sine of said input angle, generating a fourth signal proportional to the cosine of said input angle, adding said first and fourth signals together to produce a fifth signal, adding said second and third signals together to produce a sixth signal, and subtracting said sixth signal from said fifth signal.

12. A method of detecting composite error in a resolver designed to produce a first output signal proportional to the sine of an input angle and a second output signal proportional to the cosine of said input angle comprising the steps of: generating a third signal proportional to the sine of said input angle, generating a fourth signal proportional to the cosine of said input angle, algebraically combining said first, second, third and fourth signals to produce an output signal proportional to said first signal plus said fourth signal minus said second signal minus said third signal.

13. A method of dynamically detecting composite error in a resolver designed to produce a first output signal proportional to the sine of an input angle and a second output signal proportional to the cosine of an input angle comprising the steps of: generating a third signal proportional to the sine of said input angle, generating a fourth signal proportional to the cosine of said input angle, algebraically combining said first, second, third and fourth signals to produce a fifth signal proportional to said first signal plus said fourth signal minus said second signal minus said third signal, and continuously changing said input angle while said fifth signal is being produced.

14. A method of dynamically detecting composite error in a resolver designed to produce a first output signal proportional to the sine of an input angle and a second output signal proportional to the cosine of said input angle comprising the steps of: generating a third signal proportional to the sine of said input angle, generating a fourth signal proportional to the cosine of said input angle, adding said first and fourth signals together to produce a fifth signal, adding said second and third signals together to produce a sixth signal, subtracting said sixth signal from said fifth signal to produce a seventh signal, and continuously changing said input angle while said seventh signal is being produced.

References Cited
UNITED STATES PATENTS 3,068,467  12/1962  Grimaila.

RUDOLPH V. ROLINEC, *Primary Examiner.*

WALTER L. CARLSON, *Examiner.*

E. L. STOLARUN, *Assistant Examiner.*